(12) United States Patent
Durham

(10) Patent No.: US 7,032,183 B2
(45) Date of Patent: *Apr. 18, 2006

(54) DYNAMIC SITE BROWSER

(75) Inventor: Peter E. Durham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

This patent is subject to a terminal disclaimer.

(21) Appl. No.: 09/875,427

(22) Filed: Jun. 5, 2001

(65) Prior Publication Data

US 2002/0054161 A1    May 9, 2002

Related U.S. Application Data

(63) Continuation-in-part of application No. 09/134,802, filed on Aug. 14, 1998, now Pat. No. 6,256,028.

(51) Int. Cl.
*G06F 3/00* (2006.01)

(52) U.S. Cl. ............ 715/823; 715/841; 715/793; 715/760

(58) Field of Classification Search ............ 345/760, 345/764, 781, 793, 804, 810, 828, 841, 733, 345/825; 709/203, 217, 219; 715/760, 823, 715/793, 841
See application file for complete search history.

(56) References Cited

U.S. PATENT DOCUMENTS

| | | | |
|---|---|---|---|
| 5,572,643 A | 11/1996 | Judson | |
| 5,742,768 A | 4/1998 | Gennaro et al. | |
| 5,801,702 A | 9/1998 | Dolan et al. | |
| 5,805,815 A | 9/1998 | Hill | |
| 5,890,172 A | 3/1999 | Borman et al. | |
| 5,917,491 A * | 6/1999 | Bauersfeld | 345/810 |
| 5,933,599 A | 8/1999 | Nolan | |
| 5,963,208 A | 10/1999 | Dolan et al. | |
| 5,983,245 A * | 11/1999 | Newman et al. | 715/513 |
| 5,996,007 A | 11/1999 | Klug et al. | |
| 6,023,701 A | 2/2000 | Malik et al. | |
| 6,222,541 B1 * | 4/2001 | Bates et al. | 345/786 |
| 6,237,030 B1 * | 5/2001 | Adams et al. | 709/218 |
| 6,256,028 B1 * | 7/2001 | Sanford et al. | 345/841 |
| 6,338,075 B1 * | 1/2002 | Fukuda | 715/501.1 |

* cited by examiner

*Primary Examiner*—Kieu D. Vu
(74) *Attorney, Agent, or Firm*—Christensen O'Connor Johnson Kindness PLLC

(57) ABSTRACT

A method, system, and computer-readable medium for allowing easier access to the Web pages of a Web site is provided. A requested Web page that includes a menu is downloaded along with a first executable component comprising display instructions assigned the Web site. A second executable component is also downloaded with the Web page for creating a data structure in memory having a tree-like structure and including the titles of the Web site's Web pages and links to the titled Web pages. A portion of a cascading menu is generated based on the executable component and the data structure when a corresponding portion of the menu is selected. The executable components are automatically updated, if it is determined that more current versions exist.

9 Claims, 11 Drawing Sheets

```
GMT=1998.07.22 22.02
VER=02.00
SECTIONID=NEWS
URL=182112.ASP
HEADLINE=ASTRONAUT ALAN SHEPARD DIES AT 74
CLEANHEADLINE=ASTRONAUT ALAN SHEPARD DIES AT 74
ABSTRACT=ASTRONAUT ALAN SHEPARD, THE FIRST AMERICAN TO FLY IN SPACE AND ONE OF ONLY
CLEANABSTRACT=ASTRONAUT ALAN SHEPARD, THE FIRST AMERICAN TO FLY IN SPACE AND ONE OF
PDT=WED, 22 JUL 1998  14:49:00  GMT
BROWSEORDER=1,0,0
KEYWORDS=
END
SECTIONID=NEWS
URL=179692.ASP
HEADLINE=SOME RELIEF FROM THE HEAT EXPECTED
CLEANHEADLINE=SOME RELIEF FROM THE HEAT EXPECTED
ABSTRACT=THE U.S. HEATWAVE IS NOW BLAMED FOR 129 DEATHS IN SEVEN STATES AND AS PEOPLE
CLEANABSTRACT=THE U.S. HEATWAVE IS NOW BLAMED FOR 129 DEATHS IN SEVEN STATES AND A
PDT=MON,  13 JUL  1998  23:21:00  GMT
BROWSEORDER=2,1,0
KEYWORDS=
END
```

*Fig.1.* (PRIOR ART)

```
DATE=08/15/1997
TIME=09:57 AM
F=1
S=WLD
U=WLD_FRONT.ASP
H=WORLD FRONT PAGE
B=0
E
S=WLE
U=90863.ASP
H=UPS, TEAMSTERS 'CRUNCH NUMBERS'
B=1
E
S=WLD
U=93499.ASP
H=2ND NEW YORK COP COULD BE ARRESTED
B=2
E
```

*Fig.2.* (PRIOR ART)

*nm_as.NEWS='news_front.asp | News Front Page | 182112.asp | Astronaut Alan Shepard dies at 74 | 179692.asp | Some relief from the heat expected | 182154.asp | Nominee to head Air Force rejected | 175797.asp | Betty Currie testifies for fifth time | 181781.asp | U.S., U.K. pursue Lockerbie trial | 181522.asp | Welder theory discounted in ship fire | 180462.asp | Clinton vows to fight GOP on tax cuts | 181103.asp | Disease a threat to tsunami survivors | 182048.asp | Salvadoran nun killers paroled | 181991.asp | Clinton vetoes school voucher bill | 181974.asp | House, in reversal, supports NEA | http://www.msnbc.com/modules/videomoment.asp | Video Moment | *CLINTONUNDERFIRE | INVESTIGATING THE PRESIDENT | *CONCAMERICA | CONCERNING AMERICA | *KOSOVO | KOSOVO | *INTLNEWS | INTERNATIONAL NEWS | *NATLNEWS | U.S. NEWS | *SPACENEWS | SPACE NEWS | *LOCAL NEWS | TODAY IN AMERICA-LOCAL HEADLINES | *SLATE | SLATE | *HEALTH | HEALTH | *SPECCOVR | SPECIAL COVERAGE |'*

320A

322A

320B

*nm_as.CLINTONUNDERFIRE='CLINTONUNDERFIRE_Front.asp | Investigating the president Front Page | 175797.asp | Betty Currie testifies for fifth time | 123456.asp | What Cockell heards while he's on the job | 234567.asp | How agents could help widen probe | 345678.asp | Pundits on Starr, Secret Service etc. | 456789.asp | *PERJURY | PERJURY AND OBSTRUCTION OF JUSTICE | *CAMPFIN | CAMPAIGN FINANCING | *WHITEWATER | WHITEWATER LAND DEAL | *PLAYERS | THE PLAYERS | *PROSECUTOR | THE SPECIAL PROSECUTOR | *ISSUES | LEGAL ISSUES |'*

DYNAMIC SITE BROWSER

CROSS REFERENCE TO RELATED APPLICATIONS

This application is a continuation-in-part of nonprovisional U.S. patent application Ser. No. 09/134,802, filed Aug. 14, 1998, now U.S. Pat. No. 6,256,028, the entire contents of which are expressly incorporated herein by reference.

FIELD OF THE INVENTION

This invention relates to Web sites and, more particularly, to user navigation through a Web site.

BACKGROUND OF THE INVENTION

Sites on the World Wide Web ("WWW" or "Web") that provide access to multiple Web pages separated into multiple topic areas provide vast amounts of information in one central location. Web pages can include documents, articles, graphics, animation, sound, etc., that have particular relevance to a topic area of the Web site. Hyperlinks to Web pages with articles are placed in topic area Web pages that are accessed from a base Web page. For example, a news Web site may include a home page with hyperlinks to topic area Web pages, such as business and sports. The topic area Web pages include hyperlinks to Web pages with articles, etc., pertinent to the topic area Web page. A topic area Web page can also include hyperlinks to subtopic area Web pages that include hyperlinks to still other Web pages.

In the past, user navigation through the type of Web site described above has been quite tedious because a user has only been able to access a desired Web page from the topic, subtopic or other Web page that contains a hyperlink to the desired Web page. For example, assume that a user has just finished reading a baseball game summary contained on a Web page that was accessed via a hyperlink included on a subtopic Web page titled "Baseball" that was accessed via a hyperlink included on a topic Web page titled "Sports" that was accessed via a hyperlink included in a topic Web page titled "News". If such a user wants to read an article on the President that is located on a Web page that is reached via a hyperlink included on the subtopic Web page titled "Government" that is reached via a hyperlink included on the topic Web page titled "News", the user would have to back out to the baseball summary Web page through the "Baseball" and "Sports" Web pages to the topic Web page titled "News", and then access the subtopic Web page titled "Government" followed by accessing the Web page with the article on the President. Often Web sites have links to the top-level categories (topic areas) on each of the Web pages, thereby removing the need for the upward journey through the hierarchy, but the subsequent downward journey is still required.

Topic and subtopic Web pages within a Web site are still the primary location for hyperlinks that give access to multiple Web pages with articles. As a result, topic or subtopic Web pages tend to be longer than what can appear on a single screen. When Web pages are longer than what can appear on a single screen, a viewer must scroll the page in order to view all the hyperlinks to Web pages containing articles. In usability studies, scrolling has been shown to be an underutilized resource. As a result, many Web pages are not accessed simply because users do not scroll through Web pages to locate the included hyperlinks. This results in a loss of advertising revenue in situations where advertising revenue is tied to Web page access. The more a Web page is accessed by users, the more the owner of the Web page can charge for advertising space on that Web page.

In a first attempt to resolve this lack of usability, a partial navigation feature was added to a Web page to allow a user to directly access Web pages in another part of the Web site without having to progress through the Web site as described above. This technique did not fully solve the problem because the partial navigation feature contained access to only a portion of the articles in the Web site and Web pages were still being designed to require scrolling to provide access to many Web pages. The reason why this navigation feature was only a partial navigation feature relates to the feature's use of a flat datafile to generate user interactive menus. Flat datafiles occupy a large amount of memory and take a significant amount of time to download. FIGS. 1 and 2 illustrate flat datafiles of the type used by this partial navigation feature. The datafiles are voluminous because each entry occupies multiple lines. One of the lines is designated for identifying where the entries headline would be located in user interactive menus generated by the partial navigation feature. A Web site with a few hundred Web pages may require a datafile a hundred or more pages long. A datafile of this size might take several minutes to download.

Accordingly, there is a need to provide user friendly access to all the Web pages or articles on a Web site without increasing download time. The present invention is directed to providing a software-based method and apparatus for providing such access.

SUMMARY OF THE INVENTION

In accordance with the present invention, a method, system, and computer-readable medium for allowing easier access to the Web pages of a Web site is provided. A requested Web page is downloaded with a site browser and datafile assigned to the Web site. The site browser includes a version identifier and the datafile includes a timestamp. A set of cascading menus is generated based on the downloaded site browser and datafile. The datafile is a hierarchical data structure comprising titles of the Web site's Web pages and links to the titled Web pages.

In accordance with other aspects of the present invention, during downloading of a new Web page from the Web site, the version identifier of the previously received site browser is compared to a site browser version identifier attached to the downloading Web page. If the site browser version identifier attached to the downloading Web page is more current, a new site browser and datafile are downloaded. If the site browser version identifier attached to the downloading Web page is not more current, the previously received site browser and datafile are used.

In accordance with still other aspects of the present invention, during downloading of a new Web page from the Web site, the server compares the timestamp of the last sent datafile to the timestamp of a present datafile. If the timestamp of a present datafile is more current, a new datafile is downloaded. If the timestamp of a present datafile is not more current, the last sent datafile is used.

In accordance with further aspects of the present invention, during downloading of a new Web page from the Web site, a file containing the datafile timestamp assigned to the most recent datafile is requested. The datafile timestamp contained in the requested file is compared to a datafile timestamp assigned to the previously received datafile. If the datafile timestamp contained in the requested file is more current, a new datafile is downloaded. If the datafile timestamp contained in the requested file is not more current, the previously received datafile is used.

According to yet another aspect of the present invention, a requested Web page is downloaded along with a site browser and an executable program for generating a data structure that includes the titles of the Web site's Web pages and links to the titled Web pages. The code implementing the Web page builds the top level of a cascading menu when the Web page is displayed. When a portion of the menu is selected, the site browser fills additional levels of the cascading menu based on the contents of the data structure. The filled level of the cascading menu is then displayed in a Web browser and may be utilized to navigate to additional pages of the Web site.

As will be readily appreciated from the foregoing summary, the invention provides a new and improved method, apparatus, and computer-readable medium for improving user friendly access to Web pages within a Web site without increasing the downloading time of the Web pages. The use of a hierarchical datafile that represents a Web site improves download time and increases the usability of a browser for a Web site.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 1 and 2 are example datafiles used in prior art implementations of a site browser;

FIG. 9 is a data structure diagram showing an illustrative datafile script utilized in an embodiment of the present invention;

DETAILED DESCRIPTION OF AN ILLUSTRATIVE EMBODIMENT

As will be better understood from the following description, the present invention is directed to a method, system, and computer-readable medium for allowing user-friendly access to Web pages within a Web site without increasing downloading time of the Web pages.

Figure 3:
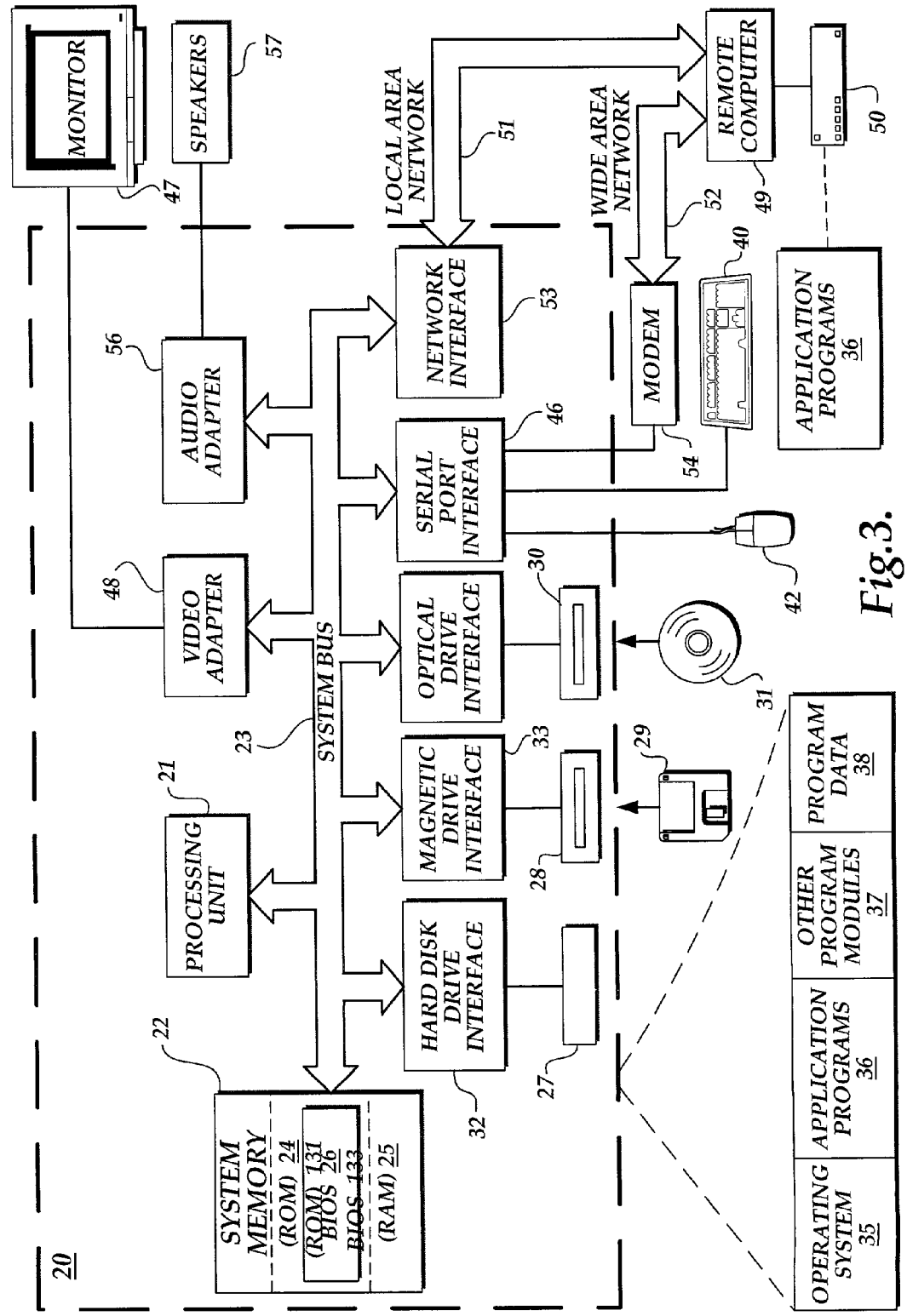
FIG. 3 is a block diagram of a general purpose computer system for implementing the present invention.

Referring now to FIG. 3, in which like numerals represent like elements, a general description of a suitable computing environment in which the present invention may be implemented will be provided. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 20, including a processing unit 21, a system memory 22, and a system bus 23 that couples various system components, including the system memory, to the processing unit 21. The system bus 23 may be any of several types of bus structures including a memory bus or memory controller, a peripheral bus, and a local bus using any of a variety of bus architectures. The system memory includes read-only memory ("ROM") 24 and random-access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for the personal computer 20. Although the exemplary environment described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus ("USB"). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 3. The logical connections depicted in FIG. 3 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof, may be stored in the remote memory storage device. It will be appreciated that the network connections shown are exemplary, and other means of establishing a communications link between the computers may be used.

The present invention, implemented on a system of the type illustrated in FIG. 3 and described above, provides dynamically updated cascading menus that allow one click access to any Web page contained in a Web site without increasing downloading time of the Web pages. When a request is made for a Web page included in a Web site, the Web page is downloaded. This request can be a manual request by a user (e.g., user enters the Universal Resource Locator ("URL") for the Web page) or can be an automatic request initiated by the user's system or by a remotely located server. For the purpose of defining the present invention, a Web site is a collection of Web pages (hypertext markup language ("HTML") files or documents) that generally cover a plurality of topics and subtopics and are interconnected through hyperlinks. A Web page is a HTML file that identifies associated files for graphics, text, etc. The Web site includes a home page for initiating user focus to the Web site.

Figure 4:
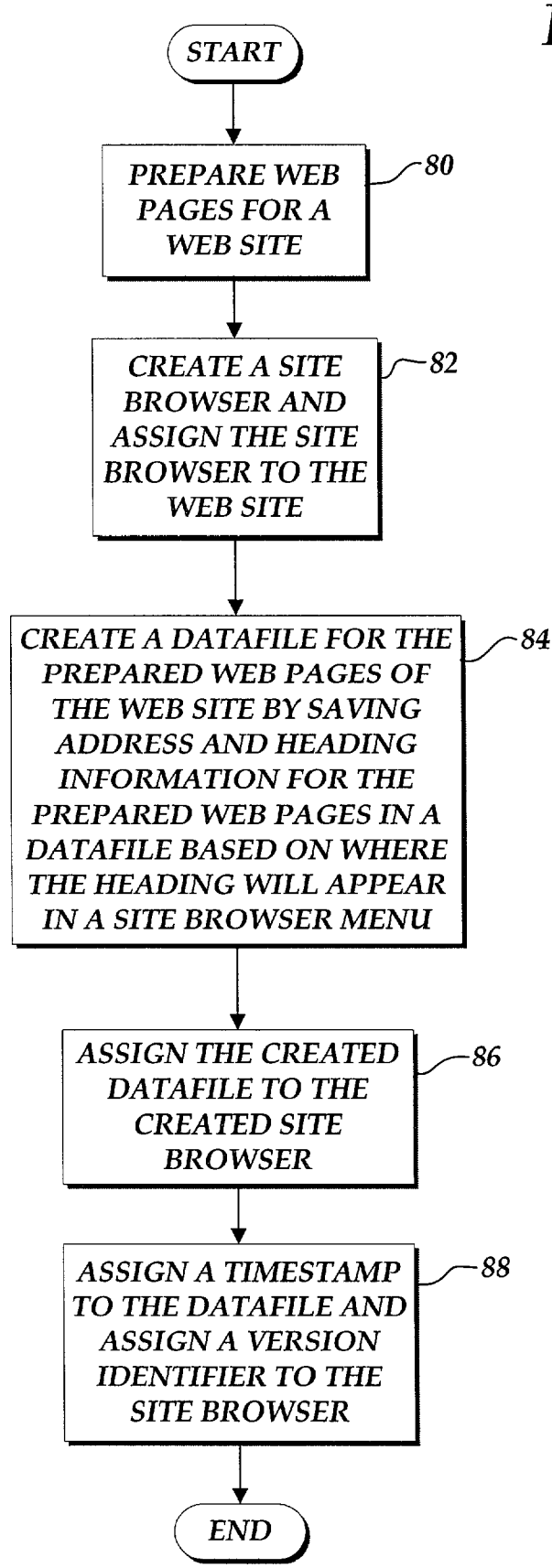
FIG. 4 is a flow diagram illustrating an example process for providing a site browser and datafile for a Web site.

FIG. 4 illustrates a process performed by the publishers (i.e., authors, editors, illustrators, etc.) of a Web site for assigning a site browser and datafile to the Web site. The datafile is a file that includes address and headings for Web pages of the Web site. The datafile is structured in a tree-like manner (hierarchy) for the purpose of providing a simple file structure that will be used by the site browser to generate cascading menus. The structure of the datafile is described in more detail below by the example shown in FIG. 7. But, before the present invention is used on a user's system, the process shown in FIG. 4 is performed. First, at block 80, the Web pages for the Web site are prepared by the Web page authors, and the browse order or Web page hierarchy that will appear in the datafile is determined. Then, at block 82, a site browser is created and assigned to the Web pages of the Web site. The site browser is computer code that will create a cascading menu using application program interface ("API") calls to the windows-based operating system on the user's system based on the structure and contents of a datafile. If the site browser is created as separately executing code, such as an ActiveX control, a JAVA applet or other similarly functioning code, the site browser is attached to the Web pages by including information into the Web page's code that defines where the site browser is located. The entire site browser can also be scripted into the Web page's code.

Still referring to FIG. 4, at block 84, a datafile is created for the prepared Web pages by saving the address (e.g., URL) and heading information for the prepared Web pages based on where the heading will appear in a cascading menu. The location where the heading will appear in the cascading menu is a choice made by the Web site publisher. At block 86, the created datafile is assigned to the created site browser. The datafile is assigned by providing its address (e.g., URL) to the site browser. Finally, at block 88, a timestamp is assigned to the datafile and a version identifier is assigned to the site browser. The steps performed in the process described above do not have to be performed in the order shown, so long as the Web pages of the Web site are prepared to execute by the processes shown in FIGS. 5 and 6 and described below.

Figure 5:
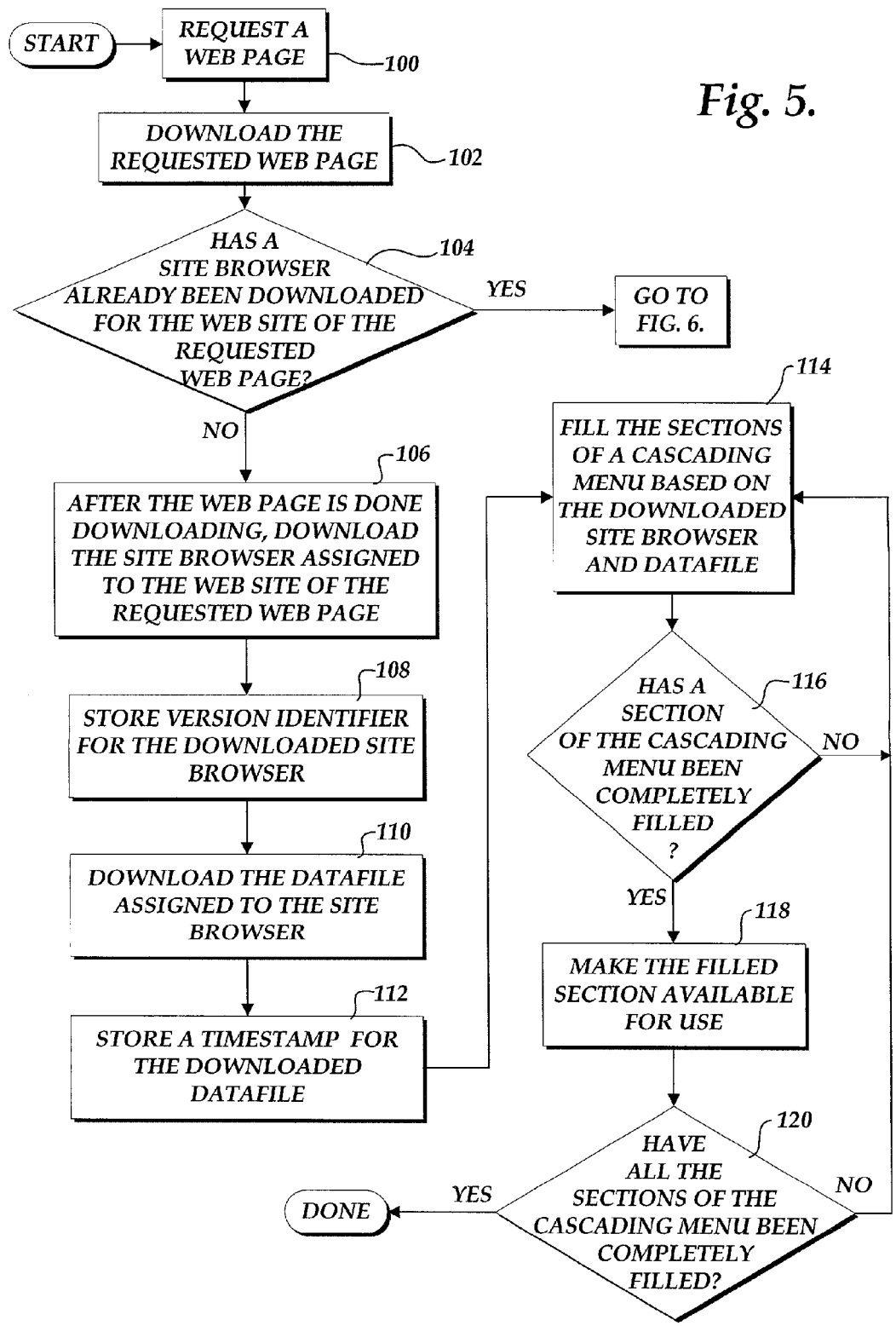
FIGS. 5 and 6 are flow diagrams illustrating example processes for accessing and updating the site browser provided by the present invention.

FIG. 5 illustrates an example process by which the present invention is implemented. First, at block 100, a request is made for any Web page of a Web site that includes a site browser formed in accordance with the present invention. At block 102, the requested Web page is downloaded. At decision block 104, the process determines if the user's system already has a stored version of the site browser for the Web site of the requested Web page. If the user's system does include the Web site's site browser, the process goes to FIG. 6 for possible updating. If the user's system does not include the Web site's site browser, the process downloads the site browser assigned to the Web site of the requested Web page. See block 106. Then, at block 108, the version identifier for the downloaded site browser is stored for later comparison. Then, at block 110, the datafile is downloaded and, at block 112, the timestamp for the downloaded datafile is stored for later comparison. As will be readily appreciated by those skilled in Web server processes, the site browser and datafile can also be downloaded before or during Web page downloading. The purpose for delaying the site browser and datafile downloading until after the Web page has been fully downloaded is to provide the user with view and interaction of the Web page without delay.

Still referring to FIG. 5, at block 114, as the site browser datafile is being downloaded, the site browser fills sections or menus (hereinafter sections and menus are used interchangeably) of the cascading menu based on the downloaded datafile. When a section of the cascading menu has been completely filled, as shown by the decision performed in decision block 116, the filled section is made available to the user. See decision block 118. If no section has been completely filled or sections remain to be filled, as determined at decision block 120, the process returns to block 114, and the sections continue to be filled. When all the information has been downloaded and the last section of the cascading menus has been filled, the process is complete. The step performed at the decision block 116 is an inherent decision step because the functions of filling sections and making filled sections available to a user are continuously performed tasks While sections remain to be filled, the filling task will be performed. As soon as a section is filled, it is made available to the user.

Figure 6:
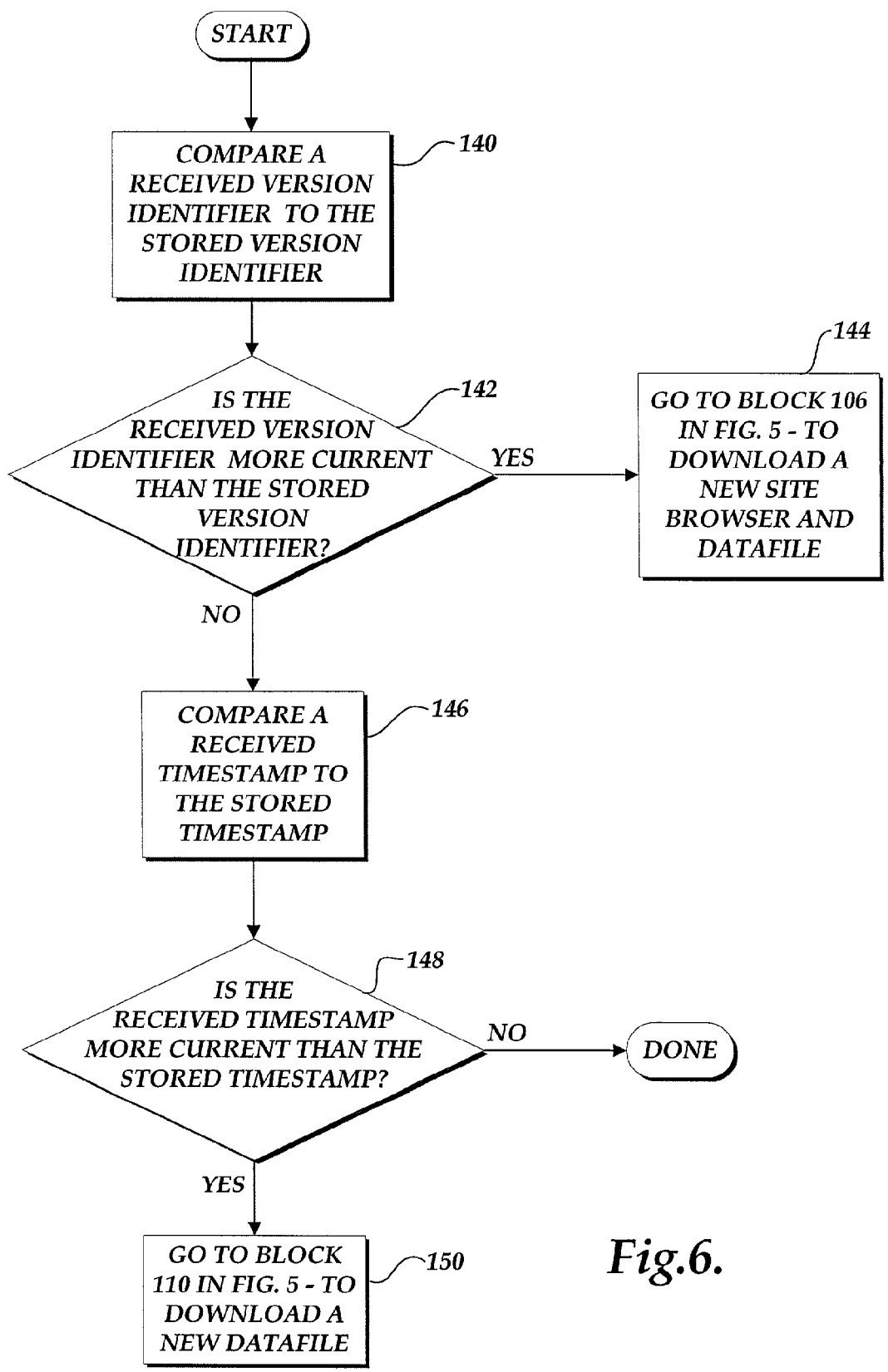

FIG. 6 illustrates an example process for automatically updating the cascading menu for a Web site. The process performed in FIG. 6 occurs whenever it was determined, at decision block 104 of FIG. 6, that a site browser has already been downloaded. First, at block 140, the site browser version identifier attached to the presently downloading Web page is compared to the stored version identifier. Then, at decision block 142, if the site browser version identifier attached to the presently downloading Web page identifies a more current version of the site browser, the process returns to block 106 in FIG. 5. See block 144. Otherwise, the process continues onto block 146 that includes the step of comparing the datafile timestamp attached to the presently downloading Web page to the stored timestamp. This comparison may occur at the server, or the process may download a file containing the datafile timestamp to perform the comparison itself. If, at decision block 148, the result of the comparison is that the datafile timestamp attached to the presently downloading Web page is not more current than the stored timestamp, the process is complete because the user's system already has the most recent datafile. If the stored timestamp is determined to have a later dating, the process returns to block 110 in FIG. 5. See block 150.

Figure 7:
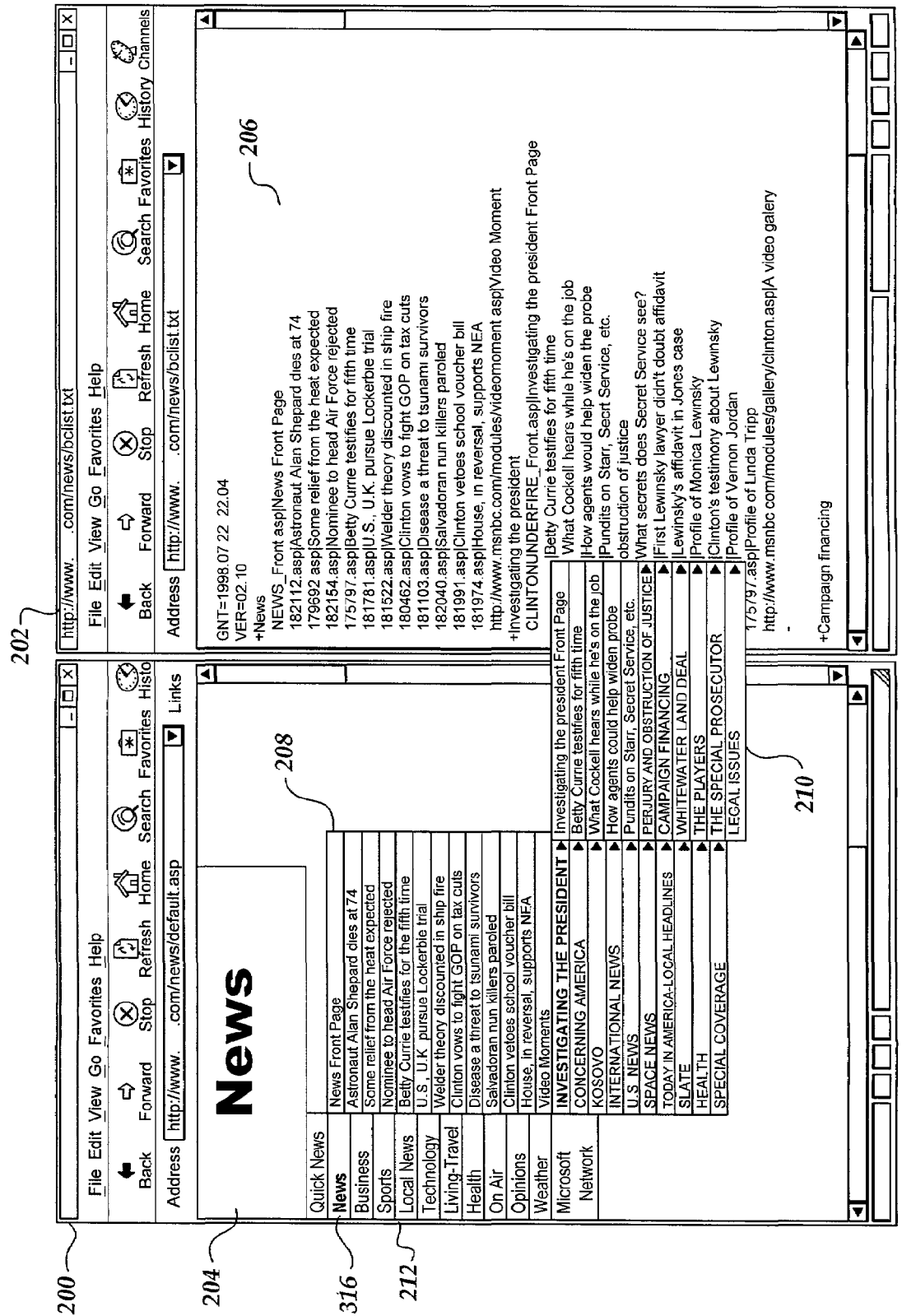
FIG. 7 is a screen shot of cascading menus generated by a Web site's site browser and the datafile used by the site browser.

FIG. 7 is a screen shot of a window-based operating system's desktop (not shown) that includes side-by-side windows 200 and 202 that display two Web pages 204 and 206, respectively. The first Web page 204 is the home page of a news Web site. The news Web site includes text, graphics, and interactive left-to-right cascading menus that are created by a downloaded site browser and corresponding datafile. Two sections 208 and 210 of the cascading menus are displayed overlaying the windows 200 and 202. The sections 208 and 210 originate from a set of menu buttons 212 that are displayed in a designated location on the Web page 204. Each menu button identifies a major topic area that most likely will include links to numerous Web pages and also include a number of subtopics. The numerous Web pages and subtopics of a menu button are presented to a user in the menus that cascade from the set of buttons 212. The list of menu buttons 212 and their designated location on the Web page 204 preferably remain the same for all the Web pages in the news Web site that are instructed to display the set of menu buttons 212.

The cascading menus include two types of line items. The first type of line item is a title of a Web page. The title is hyperlinked to the associated Web page. The second type of line item is a titled pointer to another section. The titled pointer does not provide hyperlinking to a Web page. The first and second interactive components are both activated when a mouse controlled cursor overlays the area occupied by the line item. The list of buttons 212 is preferably vertically stacked and located on the left side of the Web pages to provide user-friendly interaction and effective use the display space.

The cascading menus are generated by the site browser based on the contents of the datafile. The site browser makes API calls to the windows-based operating system on the user's system based on the structure and contents of a datafile. These API calls request the generation of cascading menus and are similar to the API calls other application programs make in order to make menus for the windows presenting those application programs.

The second Web page 206 illustrates the datafile used by the site browser to generate the cascading menus shown in the first Web page 204. When an author completes a Web page and it has been review by the editors, its address and title are saved into a datafile by the author, the editor, or a publisher using Web publishing software. When all the Web pages are complete with addresses and titles properly saved in the datafile, the datafile is given a timestamp. The author, editor, or publisher also have the ability to change the site browser. If the site browser is changed, a new version identifier is assigned to the changed site browser. Then, the new version identifier and timestamp are appended to all the Web pages of the Web site. Therefore, when one of the Web pages with the appended new version identifier and timestamp is downloaded, the new site browser and datafile will be implemented, if they have not already.

The datafile is structured in a tree-like manner in order to allow the site browser to easily comprehend the structure of the Web site. The datafile identifies when a menu begins and ends and the associated button or item in a previous menu. A menu includes two types of interactive items. The first interactive item is a heading that is hyperlinked to a Web page. The second interactive item is a heading that is hyperlinked to another menu. New menus are identified within the datafile by the lines beginning with a '+'. The text next to the '+' is included as the heading in a second interactive item. The end of a menu is identified by a '−'. Between the '+' and '−' are lines with information for generating first interactive items. Each of these lines are identified by a space followed by an address (i.e., URL) that is followed by a headline. For example, the news front page is headlined "News Front Page" and the address is NEWS_FRONT.asp. Addresses in the file may either be fully defined URLs, which can point to any page on any Web server, or relative URLs, which refer to pages in a default directory. Lines 220–230 include examples of the first address type, and line 240 includes an example of the standard URL address type. Other address types may be used provided the site browser has the ability to read the address type. Because the datafile has been organized in the tree-like manner described above, removing the need to specify redundant information and specifying items in a more compact notation than in the prior art, it occupies a great deal less space and provides better downloading performance.

Figure 8:
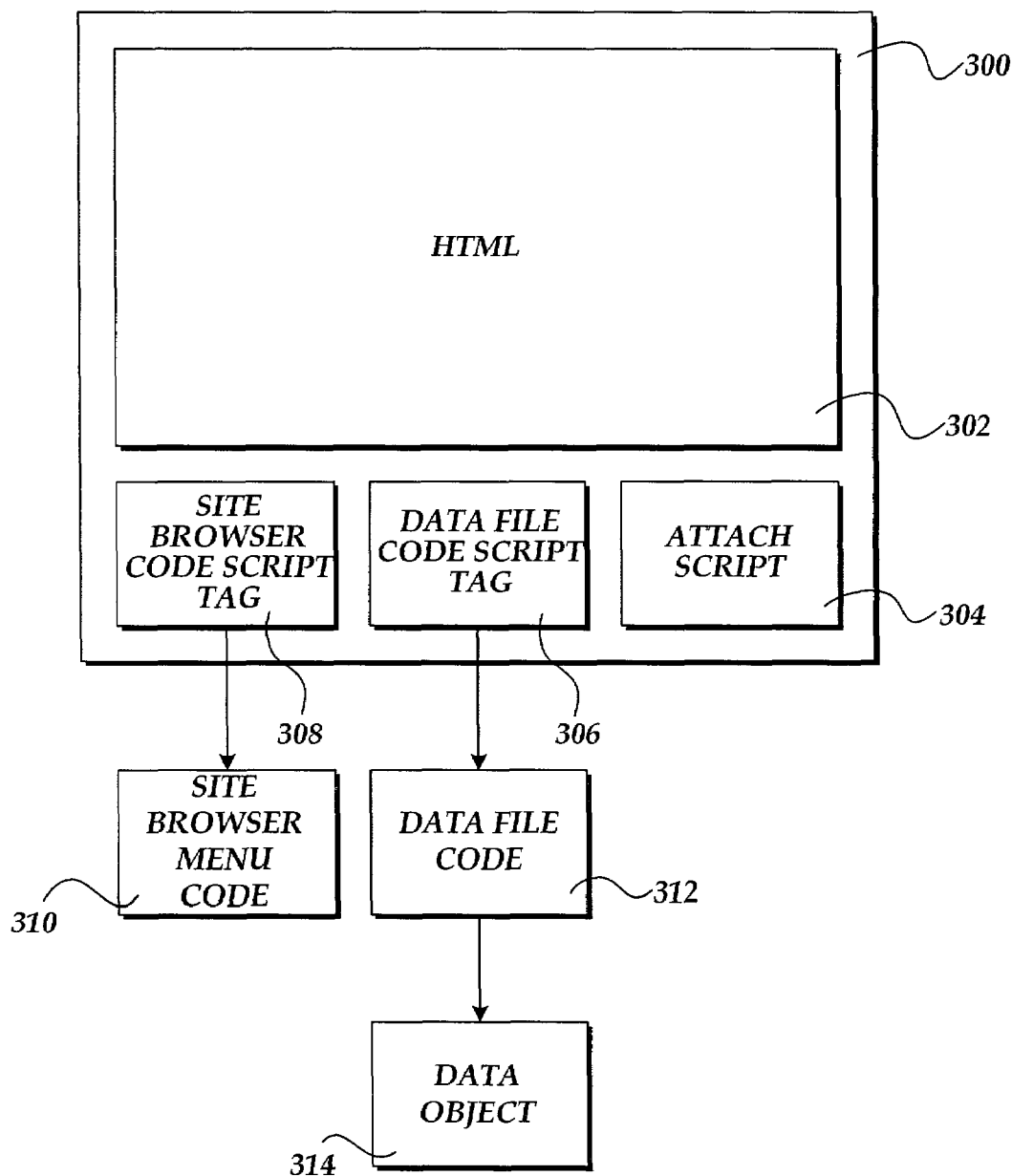
FIG. 8 is an illustrative software architecture for an embodiment of the present invention implemented using Dynamic HTML.

Referring now to FIG. 8, another actual embodiment of the present invention will be described. According to this embodiment, Dynamic HTML ("DHTML") is used to implement the cascading menu. In this embodiment of the present invention, a Web page 300 is requested by a Web browser. The Web page 300 includes HTML 302 for generating a display of a Web page and also a top level of a menu. The Web page 300 also includes a site browser code script tag 308 which causes the Web browser to download the site browser code 310. The site browser code 310 comprises a script program for generating the cascading menu. Additional details regarding the operation of the site browser code 310 will be described below with reference to FIGS. 10 and 11.

The Web page 300 also includes a datafile code script tag 306. This tag causes the browser to download the datafile code 312. The datafile code 312 is an executable script for building a data object 314 in memory comprising the titles of the Web site's Web pages and links to the titled Web pages. The datafile code 312 will be described in greater detail below with respect to FIG. 9. It should be appreciated that while the site browser code 310 and the datafile code 312 are shown as being external to the Web page 300, these scripts may be placed in-line within the HTML 302. However, by placing these files external to the Web page 300, updated or modified versions of these files may be more easily transmitted to a Web browser.

The Web page 300 also comprises an attach script 304. The attach script 304 comprises an executable script that attaches the cascading menu produced by the site browser code 310 to the top-level menu displayed by the HTML 302. The attach script 304 is in-line with the HTML 302 but may be located elsewhere. Moreover, it should be appreciated that the cascading menu may be attached to an arbitrary HTML produced by the Web page 300.

Turning now to FIG. 9, aspects of the data file code 312 will be described. As discussed briefly above, the data file code 312 comprises an executable script for building a data object 314 in memory. Properties are set on the data object 314 that define the hierarchy of the cascading menu. Each line of the data file code 312 defines the contents of a section of the cascading menu. In particular, each line of the data file code 312 comprises a string with pipe-delimited data. Pairs of substrings correspond to menu items. For stories 320A–B, the first item is the URL and the second item is the headline to be displayed in the corresponding section of the cascading menu. For subsections 322A, the first item defines a pointer to another section of the data file code 312 and the second item is the section name. It should be appreciated by those skilled in the art that the data file code 312 could be included directly in the Web page 300 or divided among several script files, such as one per top-level section. Alternatively, a portion of the data file code 312 could also be included in the Web page 300 with the remainder contained in another data file or in the data file code 312. Also, script contained in the Web page 300 can modify the properties of the data object 314 once it has been created by the datafile code 312.

Figure 10:
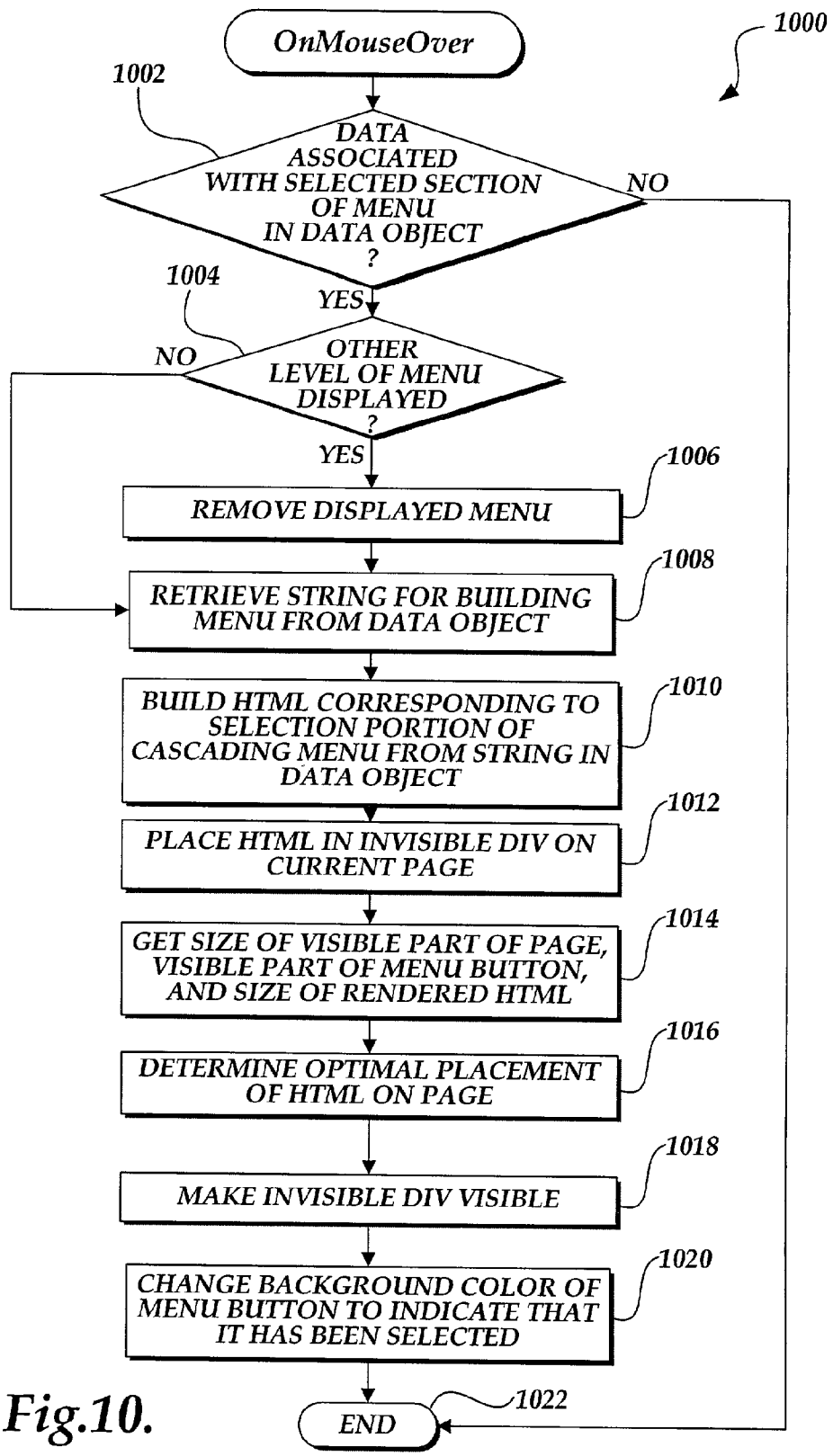
FIG. 10 is a flow diagram illustrating the processing of the selection of a menu according to an actual embodiment of the present invention.

Referring now to FIG. 10, an illustrative routine 1000 will be described that illustrates the operation of a portion of the site browser menu code 310. As mentioned briefly above, the attach script 304 links arbitrary HTML displayed by the Web page 300 to a cascading menu provided by the site browser menu code 310. In an embodiment of the present invention, the Web page 300 displays a top level of the cascading menu. This top level is linked to the cascading menu by the attach script 304. When a user moves a mouse cursor over a portion of the menu, the routine 1000 is called to generate the appropriate portion of the cascading menu. It should be appreciated that the cascading menu is not generated in this embodiment of the present invention until a user moves the mouse cursor over the menu or otherwise selects a portion of the menu.

The routine 1000 begins at block 1002, where a determination is made as to whether data associated with the selected section of the menu is contained in the data object 314. If it is determined that there is no data in the data object 314 corresponding to the selected portion of the menu, there is no menu to display. Accordingly, the routine 1000 branches from block 1002 to block 1022, where it ends. If, however, data is contained in the data object 314 associated with the selected portion of the menu, the routine 1000 continues to block 1004.

At block 1004, a determination is made as to whether a level of the cascading menu is currently being displayed other than the selected level. If another level of the menu is currently being displayed, the routine 1000 continues to block 1006, where the currently displayed level of the menu is removed. The routine 1000 then continues to block 1008. If, at block 1004, it is determined that no other level of the menu is currently being displayed, the routine 1000 branches from block 1004 to block 1008.

At block 1008, the appropriate string for building the selected portion of the cascading menu is retrieved from the data object 314. As described above, the string necessary to generate each level of the cascading menu is stored as a property within the data object 314. Accordingly, the string may be retrieved by simply referencing the appropriate property on the data object 314. The routine 1000 continues from block 1008 to block 1010.

At block 1010, the HTML corresponding to the selected portion of the cascading menu is built from the appropriate string retrieved from the data object 314. The routine 1000 then continues from block 1010 to block 1012, where the created HTML is placed in an invisible DIV on the currently displayed Web page. As known to those skilled in the art, the DIV tag specifies a container that renders HTML and may be made invisible on a page when using Dynamic HTML.

From block 1012, the routine 1000 continues to block 1014, where the size of the visible part of the page, the visible part of the created menu button, and the size of the created HTML is obtained. The routine 1000 then continues to block 1016, where this information is utilized to determine the optimal placement of the created HTML on the displayed Web page. For instance, if the selected portion of the menu is located close to a bottom of the displayed screen, the created portion of the cascading menu would be displayed above the button so that it would not disappear off the screen.

From block 1016, the routine 1000 continues to block 1018, where the previously created invisible DIV is made visible. This causes the Web browser to display the created cascading menu on the Web page. From block 1018, the routine 1000 continues to block 1020, where the background color of the selected menu button is changed to indicate that the button has been selected. The routine 1000 then continues from block 1020 to block 1022, where it ends.

Figure 11:
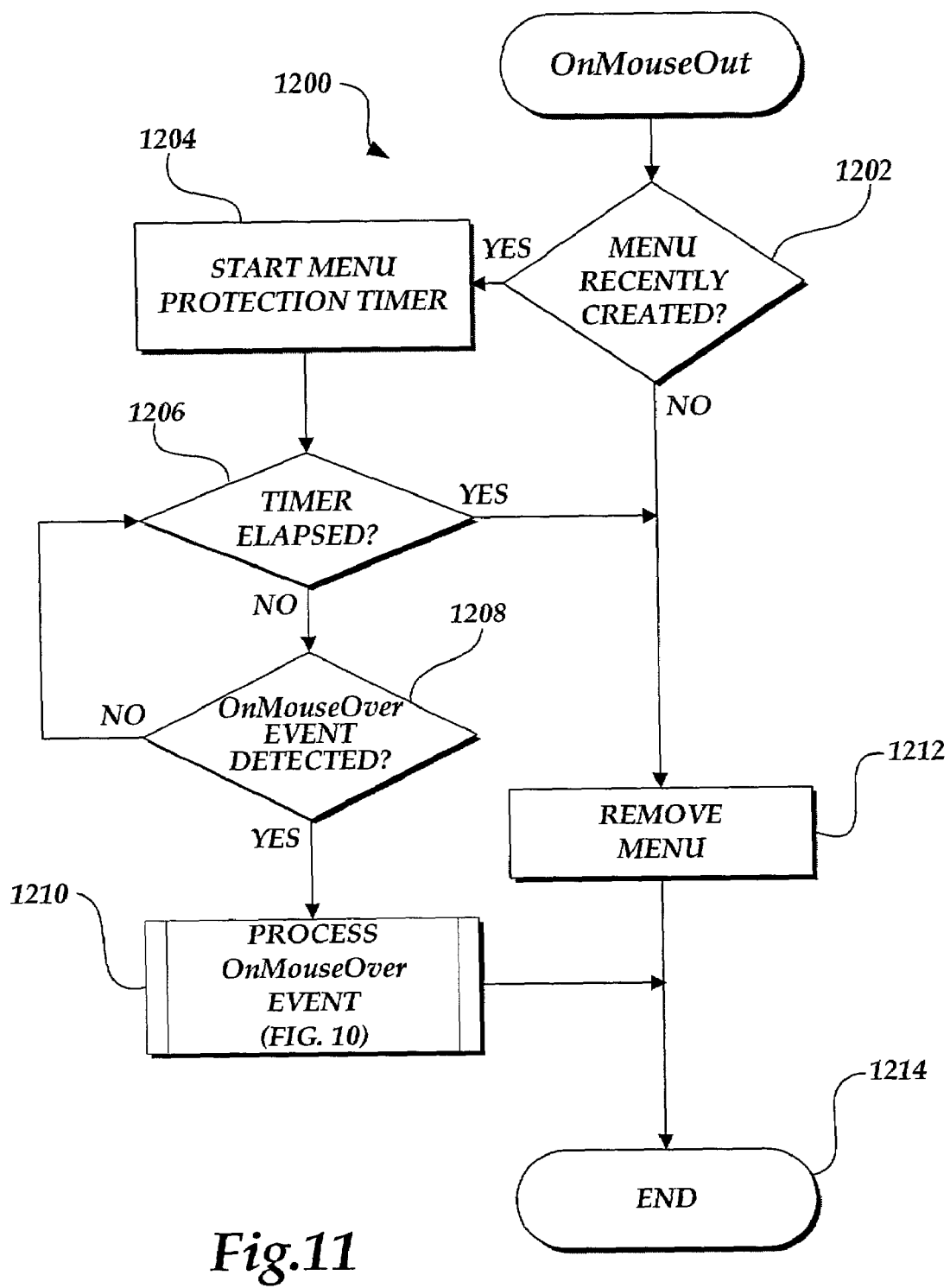
FIG. 11 is a flow diagram illustrating the processing of the deselection of a menu according to an actual embodiment of the present invention.

Referring now to FIG. 11, an illustrative routine 1200 will be described that illustrates the operation of another portion of the site browser menu code 310. The routine 1200 illustrates a procedure for removing a displayed portion of the cascading menu when the user moves a mouse cursor outside of the displayed menu or otherwise deselects the selected portion of the menu. The routine 1200 begins at block 1202, where a determination is made as to whether the deselected portion of the menu was recently created. For instance, a determination may be made as to whether the menu was created within a preset period of time, such as 250 ms. If the menu was not recently created, the routine 1202 continues to block 1212, where the deselected portion of the menu is removed. The routine 1200 then continues to block 1214, where it ends.

If, at block 1202, it is determined that the menu was recently created, the routine 1200 branches to block 1204. At block 1204, a menu protection timer is initiated. Through the use of the menu protection timer, a "grace period" may be provided for newly created menus. In this manner, a recently created section of the cascading menu would not be removed where a user briefly moves the mouse cursor off of the displayed portion of the menu and then returns the mouse cursor to the displayed portion. This may occur when a user moves the mouse cursor diagonally to select one of the subchildren of a displayed portion of the cascading menu.

From block 1204, the routine 1200 continues to block 1206, where a determination is made as to whether the menu protection timer has elapsed. If the timer has elapsed, the routine 1200 branches from block 1206 to block 1212, where the menu is removed. If, at block 1206, it is determined that the timer has not elapsed, the routine 1200 continues to block 1208.

At block 1208, a determination is made as to whether the user has moved the mouse cursor back over the selected portion of the cascading menu. If the user has not done so, the routine 1200 branches back to block 1206. If the user has made such a mouse movement, the routine 1200 continues to block 1210, where the onmouseover event is processed as described above with reference to FIG. 10. From block 1210, the routine 1200 continues to block 1214, where it ends.

While an illustrative embodiment of the invention has been illustrated and described, it should be appreciated that various changes can be made therein without departing from the spirit and scope of the invention.

The embodiments of the invention in which an exclusive property or privilege is claimed are defined as follows:

1. A method of navigating through a Web site downloaded from a server, wherein the Web site includes a plurality of Web pages, said method comprising:
   requesting a Web page of the plurality of Web pages, said Web page including a menu;
   receiving from the server the requested Web page;
   receiving from the server a first software component comprising display instructions and a second software component for generating a data structure comprising titles of the Web site's Web pages and links to the titled Web pages;
   filling a section of a cascading menu based on the display instructions and the data structure when a corresponding portion of said menu is selected; and
   displaying said filled section of said cascading menu.

2. The method of claim 1, wherein the displayed section of said cascading menu comprises at least one item linked to a Web page of the Web site.

3. The method of claim 1, wherein the displayed section of said cascading menu comprises at least one item linked to another menu of the generated set of cascading menus.

4. A system for navigating through a Web site downloaded from a server, wherein the Web site includes a plurality of Web pages, said system comprising:
   a) a user interface component for requesting a Web page of the plurality of Web pages, said Web page including a menu;
   b) a processing component coupled to the user interface component and the server; said processing component comprising:
      i) a first component for receiving from the server the requested Web page;
      ii) a second component for receiving from the server a first software component comprising display instructions, and a second software component for generating a data structure comprising titles of the Web site's Web pages and links to the titled Web pages; and
      iii) a third component for filling a section of a cascading menu based on the display instructions and the data structure when a corresponding section of said menu is selected; and
   c) a display device coupled to the processing component for displaying said filled section of said cascading menu when said corresponding section of said menu is selected.

5. The system of claim 4, wherein the displayed section of said cascading menu comprises at least one item linked to a Web page of the Web site.

6. The system of claim 4, wherein the displayed section of said cascading menu comprises at least one item linked to another menu of the generated set of cascading menus.

7. A computer-readable medium for navigating through a Web site downloaded from a server, wherein the Web site includes a plurality of Web pages, said computer-readable medium comprising:
   a) a user interface component for requesting a Web page of the plurality of Web pages, said Web pages including a menu; and
   b) a processing component coupled to the user interface component and the server; said processing component comprising:
      i) a first component for receiving from the server the requested Web page;
      ii) a second component for receiving from the server a first software component comprising display instructions, and a second software component for generating a data structure comprising titles of the Web site's Web pages and links to the titled Web pages; and
      iii) a third component for filling and displaying a portion of a cascading menu based on the display instructions and a datafile when a corresponding section of said menu is selected.

8. The computer-readable medium of claim 7, wherein the displayed portion of said cascading menu comprises at least one item linked to a Web page of the Web site.

9. The computer-readable medium of claim 7, wherein the displayed portion of said cascading menu comprises at least one item linked to another menu of the generated set of cascading menus.

\* \* \* \* \*

UNITED STATES PATENT AND TRADEMARK OFFICE
CERTIFICATE OF CORRECTION

PATENT NO.       : 7,032,183 B2                                          Page 1 of 1
APPLICATION NO.  : 09/875427
DATED            : April 18, 2006
INVENTOR(S)      : Peter E. Durham It is certified that error appears in the above-identified patent and that said Letters Patent is hereby corrected as shown below:

On the title page, in Item (75), in "Inventors", in column 1, line 1, delete "Redmond" and insert -- Bellevue --, therefor.

In column 6, line 67, after "tasks" insert -- . --.

Signed and Sealed this

Twenty-fifth Day of August, 2009

David J. Kappos
*Director of the United States Patent and Trademark Office*